US008028022B2

(12) United States Patent  
Brownholtz et al.

(10) Patent No.: US 8,028,022 B2
(45) Date of Patent: Sep. 27, 2011

(54) GENERATING CONTENT RECOMMENDATIONS FROM AN ONLINE GAME

(75) Inventors: Elizabeth A. Brownholtz, Andover, MA (US); Casey Dugan, Medford, MA (US); Werner Geyer, Boston, MA (US); David R. Millen, Boxford, MA (US); Martin T. Moore, Somerville, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 12/262,931

(22) Filed: Oct. 31, 2008

(65) Prior Publication Data

US 2010/0113155 A1 May 6, 2010

(51) Int. Cl.
*G06F 15/16* (2006.01)
*G06F 17/00* (2006.01)

(52) U.S. Cl. ............ 709/204; 709/201; 709/217; 463/9; 463/42

(58) Field of Classification Search .................. 709/201, 709/204, 205, 213, 214, 217, 219, 200; 463/42, 463/9, 27, 43, 34
See application file for complete search history.

(56) References Cited

U.S. PATENT DOCUMENTS

| 7,614,081 | B2 * | 11/2009 | Prohel et al. ................... 726/18 |
| 7,904,524 | B2 * | 3/2011 | Wehner et al. ................ 709/206 |
| 2004/0181540 | A1 | 9/2004 | Jung et al. |
| 2005/0014118 | A1 | 1/2005 | von Ahn Arellano |
| 2007/0064626 | A1 | 3/2007 | Evans |
| 2008/0040313 | A1 | 2/2008 | Schachter |
| 2008/0052371 | A1 | 2/2008 | Partovi et al. |
| 2008/0082565 | A1 | 4/2008 | Chang et al. |
| 2008/0091509 | A1 * | 4/2008 | Campbell et al. ............... 705/10 |
| 2008/0134053 | A1 | 6/2008 | Fischer |
| 2008/0154915 | A1 | 6/2008 | Flake et al. |
| 2008/0207318 | A1 * | 8/2008 | Bailey et al. ..................... 463/31 |
| 2008/0209351 | A1 | 8/2008 | Macadaan et al. |
| 2009/0013053 | A1 * | 1/2009 | Wehner et al. ................ 709/206 |
| 2009/0259526 | A1 * | 10/2009 | Bechtel et al. .................. 705/10 |
| 2010/0066015 | A1 * | 3/2010 | Hood ........................ 273/142 H |
| 2010/0153364 | A1 * | 6/2010 | Kirby ............................ 707/722 |
| 2010/0153371 | A1 * | 6/2010 | Singh ............................ 707/722 |

OTHER PUBLICATIONS

Bernstein, "Collabio: A Game for Annotating People Within Social Networks", USIT '09, Oct. 4-7, 2008.*

(Continued)

*Primary Examiner* — David Lazaro
*Assistant Examiner* — Edward J Kim
(74) *Attorney, Agent, or Firm* — Steven M. Greenberg, Esq.; Carey, Rodriguez, Greenberg & Paul

(57) ABSTRACT

A content recommendation method can include retrieving contacts for a player of a content recommendation game and listing content associated with the retrieved contacts and prompting the player in response to a selection of a particular one of the listed content to identify a specific one of the retrieved contacts as a source associated with the particular one of the listed content. The particular one of the listed content can be recommended to the identified specific one of the retrieved contacts when the player has incorrectly identified the specific one of the retrieved contacts as a source associated with the particular one of the listed content. Otherwise, the player can be awarded points in the game to a game score for the player for having correctly identified the specific one of the retrieved contacts as a source associated with the particular one of the listed content.

13 Claims, 1 Drawing Sheet

OTHER PUBLICATIONS

Web page, Got It, Let's Play, www.espgame.org.
Web page, Peekaboom, www.peekaboom.org.
Dugan, Casey, The Doogear Game: A Social Bookmark Recommender System, Group '07, Nov. 4-7, 2007, Sanibel Island, Florida.

* cited by examiner

GENERATING CONTENT RECOMMENDATIONS FROM AN ONLINE GAME

BACKGROUND OF THE INVENTION

1. Field of the Invention

The present invention relates to the field of content sharing and more particularly to game induced awareness of content.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for retrieval over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In the operation of a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information referred to as "tags" rather than merely storing bookmarks in a traditional file hierarchy. As such, users processing tags for a social bookmark can view the social bookmark for content along with the tag pertaining to the bookmark, for instance if a number of users having bookmarked the content. Further, some social bookmarking services infer clusters of bookmarks from the relationship of corresponding tags. Finally, many social bookmarking services provide subscription based feeds for lists of bookmarks, including lists organized by tags. Consequently, subscribers can become aware of new bookmarks as the bookmarks are saved, shared, and tagged by other users.

Despite the promise of social bookmarking, content oftentimes fails to enjoy the benefits of social bookmarking While social bookmarking implicitly provides a recommendation to share access to content—particularly in an automated fashion where users in a social network share common interests and pursuits—users of interest either can be omitted from an express notification of content of interest where those common interests and pursuits are not apparent to an automated social bookmarking system, or users of interest can reside outside of one's social network so as to lack the ability to obtain an awareness of relevant content.

Of course, one can expressly bring content of interest to the attention of a relevant user. For example, the well known social bookmarking technology, "del.icio.us" provides a mechanism for targeting a specific user to share a bookmark to content. Of note, depending upon the express recommendation of content is highly personal and enjoys the advantage of personal knowledge of end user interest and pursuits, even as those interests and pursuits change over time. However, requiring the end user to explicitly recommend content to users who are known to share common interests and pursuits can be tedious and requires the proactive involvement of the recommender without incentive.

BRIEF SUMMARY OF THE INVENTION

Embodiments of the present invention address deficiencies of the art in respect to social bookmarking and provide a novel and non-obvious method, system and computer program product for generating content recommendations from an online game. In an embodiment of the invention, a content recommendation method can be provided. The method can include retrieving contacts for a player of a content recommendation game and listing content associated with the retrieved contacts. The method also can include prompting the player in response to a selection of a particular one of the listed content to identify a specific one of the retrieved contacts as a source associated with the particular one of the listed content.

Finally, the method can include recommending to the identified specific one of the retrieved contacts including a link to the particular one of the listed content when the player has incorrectly identified the specific one of the retrieved contacts as a source associated with the particular one of the listed content, and otherwise awarding points in the game to a game score for the player for having correctly identified the specific one of the retrieved contacts as a source associated with the particular one of the listed content. In one aspect of the embodiment, the player can be prompted in response to a selection of a particular one of the listed content to identify a specific one of the retrieved contacts as a source associated with the particular one of the listed content within a threshold period of time. Consequently, the method also can include deducting points from the game score when the player fails to respond to the prompting within the threshold period of time.

In another embodiment of the invention, a social media data processing system can be configured for generating content recommendations from an online game. The system can include a host computing platform configured for communicative coupling to multiple different clients over a computer communications network. Each of the clients can include a browser providing access to interact with content and corresponding meta-data for the content. The system also can include a social bookmarking system coupled to the host computing platform managing tags applied through the clients to content viewed within respective ones of the browsers. Finally, the system can include a content recommendation game executing in the host computing platform.

The game can include program code enabled to retrieve contacts for a player of the game, to list content associated with the retrieved contacts, to prompt the player in response to a selection of a particular one of the listed content to identify a specific one of the retrieved contacts as a source associated with the particular one of the listed content, and to recommend to the identified specific one of the retrieved contacts the particular one of the listed content, including a link to the particular one of the listed content, when the player has incorrectly identified the specific one of the retrieved contacts as a source associated with the particular one of the listed content, and otherwise to award points in the game to a game score for the player for having correctly identified the specific one of the retrieved contacts as a source associated with the particular one of the listed content.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for generating content recommendations from an online game. In accordance with an embodiment of the present invention, a game user interface can be generated for an end user to include a listing of content distributed about and accessible through a computer communications network. Further, meta-data related to the content can be rendered in association with the content. Game points can be awarded to the end user based upon the correct source identification of portions of the meta-data in order to incentivize the end user to actively attempt to identify the source of portions of the meta-data for specifically selected content.

Accordingly, in the course of conduct of the online game, specific content in the listing can be selected in consequence of which the end user can be prompted to identify another end user as a source of at least one portion of the meta-data. Thereafter, in response to the identification of another end user, a notification referencing the selected content can be transmitted to the identified end user when the identified end user is determined not to have been the source of the portion of the meta-data. In this way, the human intelligence associated with the incorrect guess of the end user can be relied upon to learn a new end user likely to benefit from access to the selected content.

Figure 1:
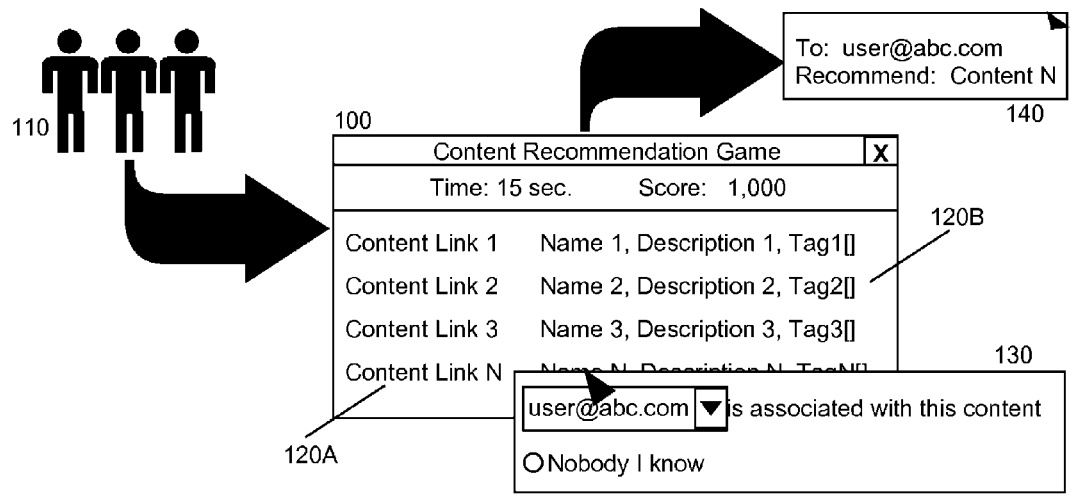
FIG. 1 is a pictorial illustration of a game interface for generating content recommendations from an online game.

In further illustration, FIG. 1 is a pictorial illustration of a game interface for generating content recommendations from an online game. As shown in FIG. 1, an online game user interface 100 can provide a user interface to a content recommendation game for a player. A listing of content 120A in the game user interface 100 can be generated from the contacts 110 of the player and the content 120A can include, by way of example, bookmarks to Web sites, photos, videos and other content associated with the contacts 110 of the player. Additionally, meta-data 120B can be included in the listing for the content 120A and can include, for instance, a name, description and one or more tags for the content 120A.

The player can select content 120A in the listing in response to which the player can be presented with a context dialog 130. The context dialog 130 can prompt the player to choose whether the selected content 120A, or alternatively, meta-data 120B for the selected content 120A had been provided by one of the contacts 110. For example, the context dialog 130 can prompt the player to specifically identify a particular one of the contacts providing the selected content 120A, or to determine that the selected content 120A had been provided by someone other than one of the contacts 110.

Points can be awarded to the player for, within a threshold period of time, correctly identifying one of the contacts 110 as the source of the selected content 120A (or the source of the meta-data 120B associated with the selected content 120A) and points can be subtracted for incorrectly identifying one of the contacts 110 as the source of the selected content 120A (or the source of the meta-data 120B associated with the selected content 120A). To the extent that the player incorrectly identifies one of the contacts 110 as the source of the selected content 120A (or the source of the meta-data 120B associated with the selected content 120A), the selected content 120A can be recommended to the identified one of the contacts 110, for example by way of a message 140 sent to the identified one of the contacts 110 with a suggestion to view the selected content 120A.

Figures 2, 3:
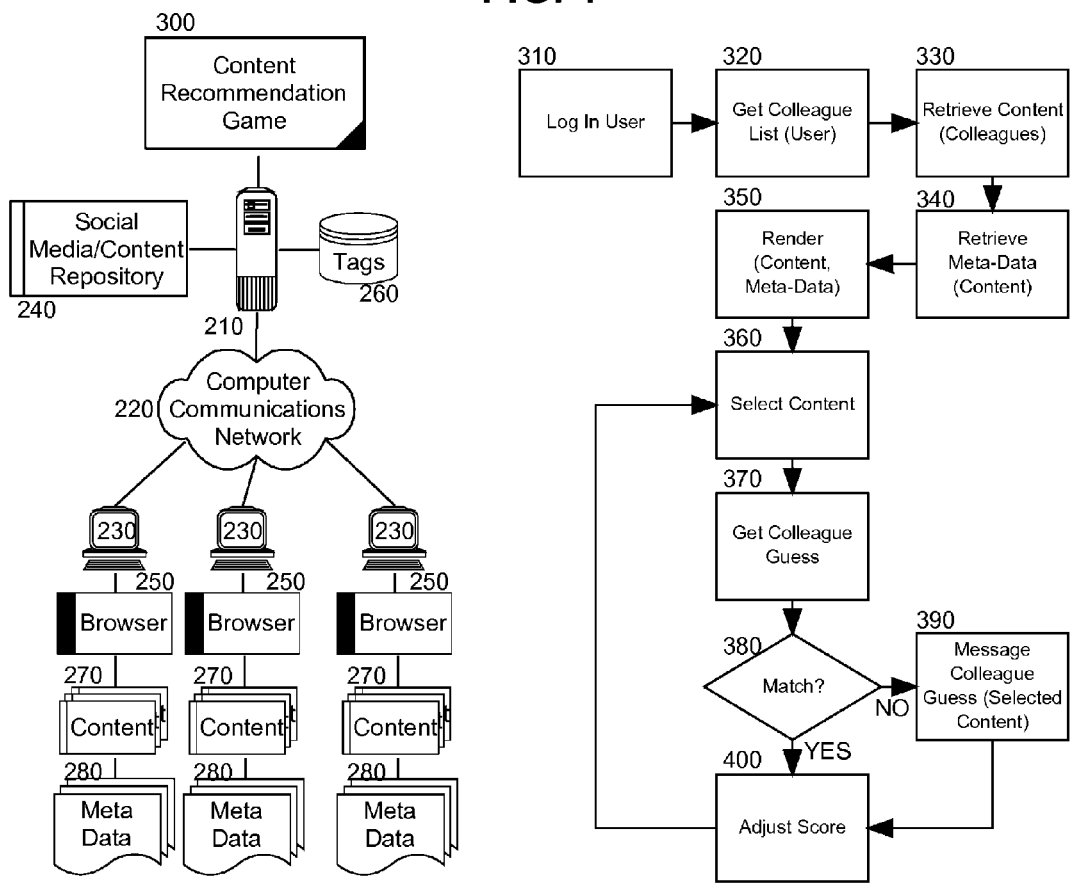
FIG. 2 is a schematic illustration of a social media data processing system configured for generating content recommendations from an online game; and, FIG. 3 is a flow chart illustrating a process for generating content recommendations from an online game.

The content recommendation game of FIG. 1 can be implemented within a social media data processing system. In illustration, FIG. 2 schematically shows a social media data processing system configured for generating content recommendations from an online game. The system can include a host computing platform 210 configured for communicative coupling to different clients 230 over computer communications network 220. Each of the client 230 can include a content browser 250 through which end users can view and interact with content 270 such as Web sites, images, audio, video and audio-visual content. Further, the content 270 can include meta-data 280 such as a name, description and one or more tags applied by end users accessing corresponding content 270.

The host computing platform 210 can include a social media/content repository 240 enabled to centrally apply tags 260 to content 270 accessed by end users and to share the tags 260 of end users sharing a common social network. Notably, the host computing platform 210 also can host the operation of a content recommendation game 300. The content recommendation game 300 can be a computer program including program code enabled to identify contacts of a player and to list to the player content 270 and content meta-data 280 accessed by and therefore associated with the identified contacts of the player.

The program code further can be enabled in response to a selection of particular content 270 to prompt the player to specify an end user from which the particular content 270 had been associated. To the extent the player correctly specifies the end user from which the particular content 270 had been associated, the player can be awarded points for the game. However, if the player incorrectly specifies an end user from which the particular content 270 had not in fact been associated, the program code can be enabled to recommend to the specified end user the particular content 270 and corresponding meta-data 280, for example by sending a message with a link to the particular content 270, or by storing a link to the particular content 270 for subsequent access by the specified end user and notifying the specific end user of the storage of the link. In this way, the participation of the player in the content recommendation game 300 can provide a mechanism for recommending content 270 and corresponding meta-data 280 to end users likely to be interested in accessing the recommended content 270.

In yet further illustration of the operation of the content recommendation game, FIG. 3 is a flow chart illustrating a process for generating content recommendations from an online game. Beginning in block 310, a player can log into the game and in block 320, a listing of contacts can be retrieved for the player, for example by retrieving the contacts in the player's address book, or social network to name two possibilities. In block 330, content accessed or created by the contacts in the list can be retrieved as content associated with the contacts in the list, including bookmarks to Web sites, audio, photos and video. Likewise, in block 340 meta-data can be retrieved for the content, for instance content names, descriptions and one or more tags. Thereafter, the content and meta-data can be rendered in a user interface to the game.

In block 360, responsive to player user interface interactions with the content and meta-data, particular content can be selected for evaluation and in block 370 the player can be prompted to guess as to which contact is associated with the particular content as the source of the addition of the content to the game. For example, the player can select from a drop-down list of the contacts, or the player can manually specify a contact. In decision block 380, if the player correctly guesses the contact as the source of the addition of the content to the game (within a threshold period of time), in block 400 the player can be awarded points in the game and the score for the player can be updated to reflect the added points.

However, in decision block 380, if the player incorrectly guesses the source of the addition of the content to the game, in block 390 the content can be recommended to the incorrectly identified source, including providing to the source a link to the content and a specification also of the meta-data for the content. Subsequently, in block 400 the score of the player can be reduced to reflect the incorrect guess. Though not shown, if the player fails to respond to the prompt within the threshold period of time, in block 400 the score of the player can be reduced more so than if the player incorrectly guesses the source of the addition of the content to the game because the inaction of the player provides the least social benefit to the community participating in the content recommendation game.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A content recommendation method comprising:
retrieving contacts for a player of a content recommendation game;
listing content associated with the retrieved contacts;
prompting the player in response to a selection of a particular one of the listed content to identify a specific one of the retrieved contacts as a source associated with the particular one of the listed content; and,
recommending the particular one of the listed content to the identified specific one of the retrieved contacts when the player has incorrectly identified the specific one of the retrieved contacts as a source associated with the particular one of the listed content, and otherwise awarding points in the game to a game score for the player for having correctly identified the specific one of the retrieved contacts as a source associated with the particular one of the listed content.

2. The method of claim 1, wherein listing content associated with the retrieved contacts comprises listing content associated with the retrieved contacts and corresponding meta-data for the listed content.

3. The method of claim 1, wherein prompting the player in response to a selection of a particular one of the listed content to identify a specific one of the retrieved contacts as a source associated with the particular one of the listed content, comprises prompting the player in response to a selection of a particular one of the listed content to identify a specific one of the retrieved contacts as a source associated with the particular one of the listed content within a threshold period of time.

4. The method of claim 3, further comprising deducting points from the game score when the player fails to respond to the prompting within the threshold period of time.

5. A social media data processing system configured for generating content recommendations from an online game, the system comprising:
a host computing platform configured for communicative coupling to multiple different clients over a computer communications network, each of the clients comprising a browser providing access to interact with content and corresponding meta-data for the content;

a social media/content repository coupled to the host computing platform managing tags applied through the clients to content viewed within respective ones of the browsers; and, a content recommendation game executing in the host computing platform, the game comprising program code enabled to retrieve contacts for a player of the game, to list content associated with the retrieved contacts, to prompt the player in response to a selection of a particular one of the listed content to identify a specific one of the retrieved contacts as a source associated with the particular one of the listed content, and to recommend the particular one of the listed content to the identified specific one of the retrieved contacts when the player has incorrectly identified the specific one of the retrieved contacts as a source associated with the particular one of the listed content, and otherwise to award points in the game to a game score for the player for having correctly identified the specific one of the retrieved contacts as a source associated with the particular one of the listed content.

6. The system of claim 5, wherein the content is a bookmark to a Web site.

7. The system of claim 5, wherein the content is an image.

8. The system of claim 5, wherein the content is a video.

9. The system of claim 5, wherein the content is audio.

10. A computer program product comprising a computer storage device embodying computer usable program code for content recommendation, the computer program product comprising:

computer usable program code for retrieving contacts for a player of a content recommendation game;

computer usable program code for listing content associated with the retrieved contacts;

computer usable program code for prompting the player in response to a selection of a particular one of the listed content to identify a specific one of the retrieved contacts as a source associated with the particular one of the listed content; and, computer usable program code for recommending the particular one of the listed content to the identified specific one of the retrieved contacts when the player has incorrectly identified the specific one of the retrieved contacts as a source associated with the particular one of the listed content, and otherwise awarding points in the game to a game score for the player for having correctly identified the specific one of the retrieved contacts as a source associated with the particular one of the listed content.

11. The computer program product of claim 10, wherein the computer usable program code for listing content associated with the retrieved contacts comprises computer usable program code for listing content accessed by the retrieved contacts and corresponding meta-data for the listed content.

12. The computer program product of claim 10, wherein the computer usable program code for prompting the player in response to a selection of a particular one of the listed content to identify a specific one of the retrieved contacts as a source associated with the particular one of the listed content, comprises computer usable program code for prompting the player in response to a selection of a particular one of the listed content to identify a specific one of the retrieved contacts as a source associated with the particular one of the listed content within a threshold period of time.

13. The computer program product of claim 12, further comprising computer usable program code for deducting points from the game score when the player fails to respond to the prompting within the threshold period of time.

* * * * *